(12) United States Patent
Yoshida et al.

(10) Patent No.: US 8,493,456 B2
(45) Date of Patent: Jul. 23, 2013

(54) VIDEO STILL CAMERA

(75) Inventors: Chisato Yoshida, Saitama (JP); Sachi Kaho, Tokyo (JP); Yuu Hirono, Tokyo (JP); Hiroyuki Suzuki, Kanagawa (JP)

(73) Assignee: Sony Corporation (JP)

( * ) Notice: Subject to any disclaimer, the term of this patent is extended or adjusted under 35 U.S.C. 154(b) by 23 days.

(21) Appl. No.: 13/343,241

(22) Filed: Jan. 4, 2012

(65) Prior Publication Data

US 2012/0105659 A1 May 3, 2012

Related U.S. Application Data

(60) Continuation of application No. 12/074,844, filed on Mar. 5, 2008, now Pat. No. 8,139,119, which is a continuation of application No. 10/207,472, filed on Jul. 29, 2002, now Pat. No. 7,428,017, which is a division of application No. 08/906,103, filed on Aug. 5, 1997, now Pat. No. 6,445,417.

(30) Foreign Application Priority Data

Aug. 19, 1996 (JP) .................................... 08-217616

(51) Int. Cl.
*H04N 5/232* (2006.01)
*H04N 5/225* (2006.01)

(52) U.S. Cl.
USPC ....................................... 348/211.2; 348/375

(58) Field of Classification Search
USPC ................ 348/371, 373, 375, 376, 214, 118, 348/143, 148, 333.06, 333.07, 211.1, 211.3, 348/211.99, 207.1, 207.2; 396/428, 535, 396/541, 342, 347, 348, 174, 381, 383; 358/906, 358/907

See application file for complete search history.

(56) References Cited

U.S. PATENT DOCUMENTS

| | | | |
|---|---|---|---|
| 4,508,440 A | 4/1985 | Costa et al. | |
| 4,508,441 A | 4/1985 | Launie | |
| 4,542,967 A | 9/1985 | Costa et al. | |
| 4,610,625 A | 9/1986 | Bunn | |
| 4,616,257 A | 10/1986 | Kloots et al. | |
| 4,660,627 A | 4/1987 | Deck | |
| 4,666,275 A | 5/1987 | Tamamura | |
| 4,688,913 A | 8/1987 | Whiteside et al. | |
| 4,723,140 A | 2/1988 | Whiteside et al. | |

(Continued)

FOREIGN PATENT DOCUMENTS

| | | |
|---|---|---|
| EP | 0656726 A1 | 6/1995 |
| JP | 63-178962 U | 11/1988 |

(Continued)

OTHER PUBLICATIONS

Office Action from Corresponding Japanese Application 2007-340168.

*Primary Examiner* — Aung S Moe
(74) *Attorney, Agent, or Firm* — Lerner, David, Littenberg, Krumholz & Mentlik, LLP

(57) ABSTRACT

A digital still camera has a cylindrical image pick up portion with a lens, a strobe unit, and a display. The image pick up unit is cylindrical and is rotatably held at each end, so that the lens and strobe unit move in concert. The image pick up unit can be rotated to face the rear of the camera, where the display is located, so that the user can do self-images.

11 Claims, 9 Drawing Sheets

U.S. PATENT DOCUMENTS

| | | | |
|---|---|---|---|
| 5,177,519 A * | 1/1993 | Goto et al. | 396/265 |
| 5,194,885 A | 3/1993 | Spencer | |
| 5,276,473 A | 1/1994 | Stephenson, III | |
| 5,287,135 A | 2/1994 | Arai et al. | |
| 5,365,350 A | 11/1994 | Kawasaki et al. | |
| 5,491,507 A | 2/1996 | Umezawa et al. | |
| 5,521,665 A | 5/1996 | Petruchik | |
| 5,550,754 A | 8/1996 | McNelley et al. | |
| 5,559,554 A | 9/1996 | Uekane et al. | |
| 5,594,524 A * | 1/1997 | Sasagaki et al. | 396/287 |
| 5,612,732 A | 3/1997 | Yuyama et al. | |
| 5,720,928 A | 2/1998 | Schwartz | |
| D391,590 S | 3/1998 | Sumita | |
| 5,729,289 A | 3/1998 | Etoh | |
| 5,734,414 A | 3/1998 | Nishimura et al. | |
| 5,737,491 A | 4/1998 | Allen et al. | |
| 5,781,807 A | 7/1998 | Glassgold et al. | |
| 5,790,019 A | 8/1998 | Edwin | |
| 5,790,193 A | 8/1998 | Ohmori | |
| 5,956,084 A | 9/1999 | Moronaga et al. | |
| 5,966,166 A | 10/1999 | Coutinho et al. | |
| 6,006,039 A | 12/1999 | Steinberg et al. | |
| 6,052,508 A * | 4/2000 | Mincy et al. | 386/281 |
| 6,445,417 B1 | 9/2002 | Yoshida et al. | |
| 6,507,361 B1 | 1/2003 | Barber | |
| 2007/0242137 A1 * | 10/2007 | McKain et al. | 348/207.99 |

FOREIGN PATENT DOCUMENTS

| | | |
|---|---|---|
| JP | 2-37879 A | 2/1990 |
| JP | 3-163965 A | 7/1991 |
| JP | 4-100382 | 4/1992 |
| JP | 4-145775 | 5/1992 |
| JP | 5-30832 U | 4/1993 |
| JP | 6141210 A | 5/1994 |
| JP | 06141210 A | 5/1994 |
| JP | 6-284418 A | 7/1994 |
| JP | 1995024854 | 6/1995 |
| JP | 7-212640 A | 8/1995 |
| JP | 8-032843 | 2/1996 |
| JP | 8-65566 A | 3/1996 |
| JP | 08186768 A | 7/1996 |
| JP | 8-205016 A | 8/1996 |
| JP | 9-139876 | 5/1997 |
| JP | 10-023365 | 1/1998 |

* cited by examiner

VIDEO STILL CAMERA

CROSS-REFERENCE TO RELATED APPLICATIONS

This application is a continuation of U.S. application Ser. No. 12/074,844, filed Mar. 5, 2008 which is a continuation of U.S. application Ser. No. 10/207,472, filed on Jul. 29, 2002, which is a divisional of U.S. patent application Ser. No. 08/906,103, filed Aug. 5, 1997, now U.S. Pat. No. 6,445,417, which claims the benefit of Japanese Patent Application No. P08-217616, filed Aug. 19, 1996, the disclosures of which are incorporated herein by reference.

BACKGROUND OF THE INVENTION

The present invention relates to a video still camera which is constructed so that a photographed pictorial image is recorded in a built-in recording medium, etc.

Conventionally, there is a digital camera which is constructed so that a pictorial image photographed through a lens unit is recorded in a built-in memory or a loading memory card used as a recording medium. Moreover, there is such a digital camera which is provided with a liquid crystal image display unit for displaying the photographed pictorial image.

In the digital still camera including the aforesaid image display unit, a pictorial image of an object captured by the lens unit is displayed on the image display unit. Hence, photographing is carried out while looking at the pictorial image.

Moreover, the digital still camera is provided with a strobe which is convenient for photographing in poor light or in back light. The strobe is fixed onto a camera body together with the lens unit.

As described above, the digital camera which is constructed so that the photographed image is digitally recorded in the built-in memory, etc., is relatively large in size, and also, a housing for fitting the lens unit and the strobe unit is integrated with a camera body. For this reason, in the case where photographing is carried out in a low angle position or a high angle position, an angle of user's hand holding the camera body must be changed; therefore, it has been inconvenient for the user.

In particular, in the digital camera including the liquid crystal image display unit, the image display unit comprises a liquid crystal display, and is fitted to a back side of the camera body. The liquid crystal display has a vertical screen, so that during photographing, the user must look at the vertical screen in a state of being apart from his eyes. Thus, in the case where the photographing is carried out in a low angle position or a high angle position, an angle of user's hand holding the camera body must be changed largely, or the user must change his hands holding the camera body in position; therefore, there has arisen a disadvantage that a feel is lost, or operability such as a shutter operation or the like is lost.

SUMMARY OF THE INVENTION

In view of such aspects, it is an object of the present invention to provide a video still camera which is capable of carrying out photographing without changing an angle of user's hand holding the camera body or changing user's hand position, and which is the most suitable for strobe flash photographing.

To achieve the above object, the present invention provides a video still camera having a construction in which a photographing unit including a lens unit and a strobe unit is attached to a camera body so that it is rotatable in an up-and-down direction.

With the above construction, in the case where photographing is carried out in a low angle position and in a high angle position, the photographing unit is rotatable in the up-and-down direction with respect to the camera body. Whereby strobe flash photographing can be readily carried out in the up-and-down direction and in front and rear directions without changing an angle of user's hand holding the camera body or changing user's hand position.

DETAILED DESCRIPTION

An embodiment of a video still camera according to the present invention will be described below with reference to the accompanying drawings.

Figure 1:
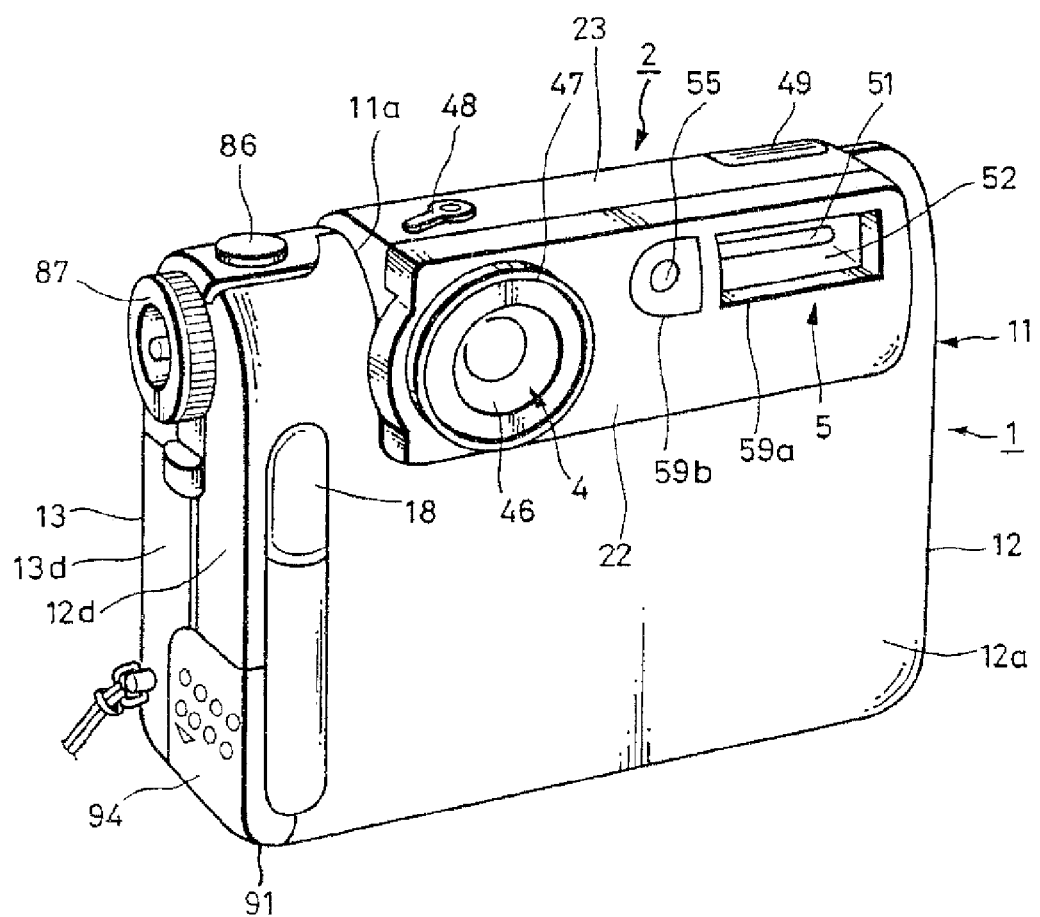
FIG. 1 is a perspective view showing a front side of a video still camera according to an example of the present invention.
Figure 2:
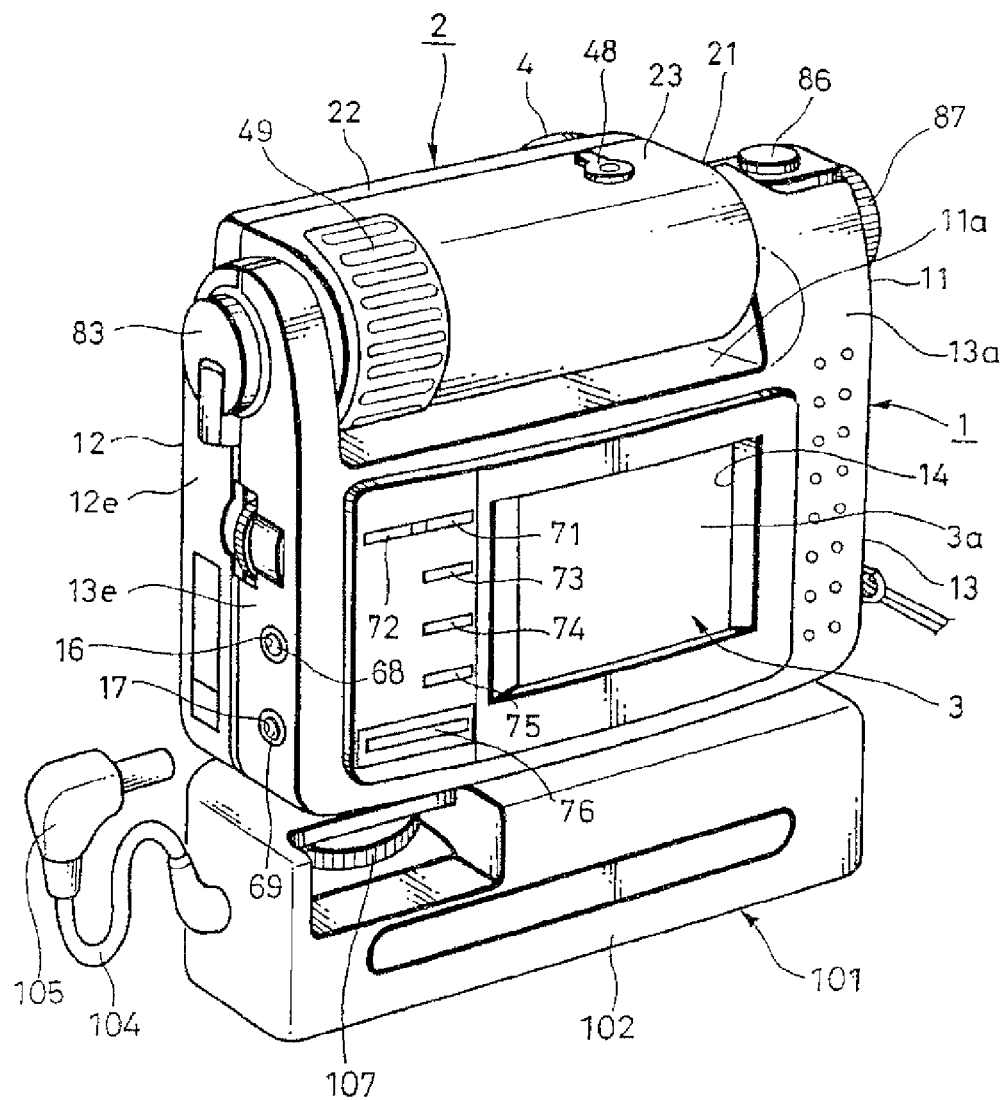
FIG. 2 is a perspective view showing a rear side of the video still camera shown in FIG. 1 attached with a dry battery adapter.
Figure 3:
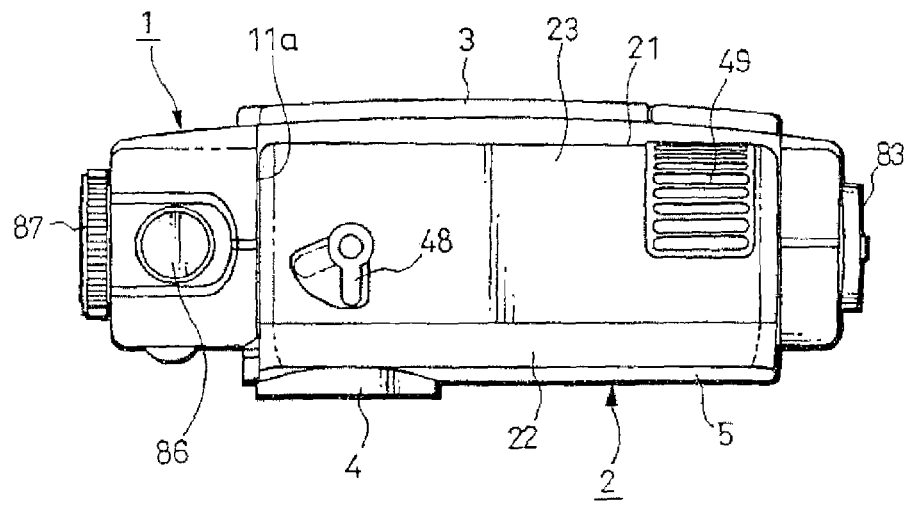
FIG. 3 is a plan view of the video still camera shown in FIG. 1.
Figure 4:
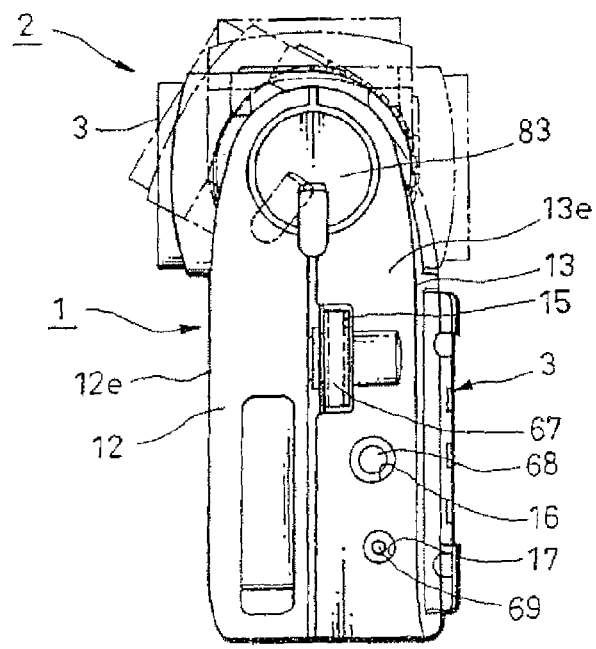
FIG. 4 is a right side view of the video still camera shown in FIG. 1.
Figure 5:
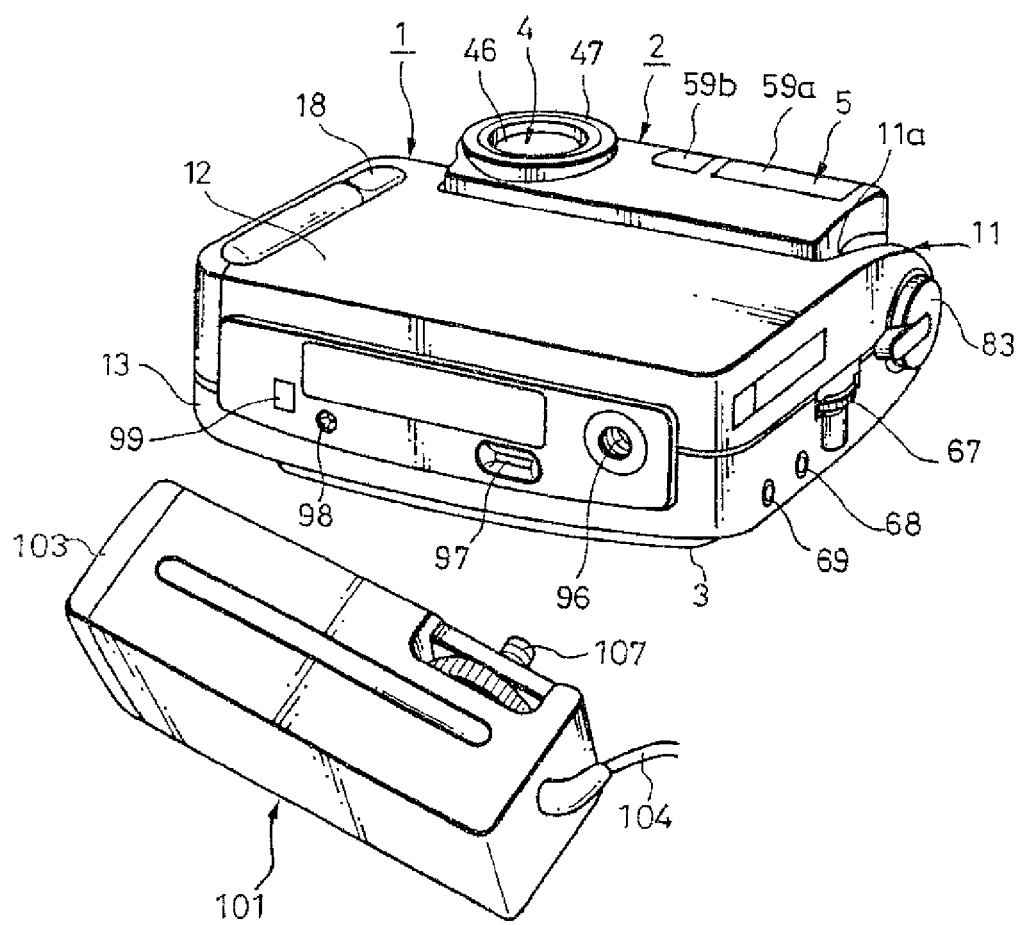
FIG. 5 is a perspective view showing a lower surface side of the video still camera shown in FIG. 1 in a state that the dry battery adapter is removed therefrom.

FIG. 1 is a perspective view showing a front side of a video still camera of the present embodiment; FIG. 2 is a perspective view showing a rear side of the video still camera; FIG. 3 is a plan view of the video still camera; FIG. 4 is a side view of the video still camera; and FIG. 5 is a perspective view showing a lower face side of the video still camera. In FIG. 1 to FIG. 5, a reference numeral 1 denotes a camera body, and 2 denotes a photographing unit. The camera body 1 has a built-in recording/reproducing unit including a flash memory as a recording medium, and is provided with an image display unit 3 at the substantially center portion on the back side thereof. Also, the photographing unit 2 is provided with a lens unit 4 and a strobe unit 5 which are arranged in a transverse direction with a predetermined interval. Further, the photographing unit 2 is attached to an upper portion of the camera body 1 so as to be rotatable in an up-and-down direction.

Figure 8:
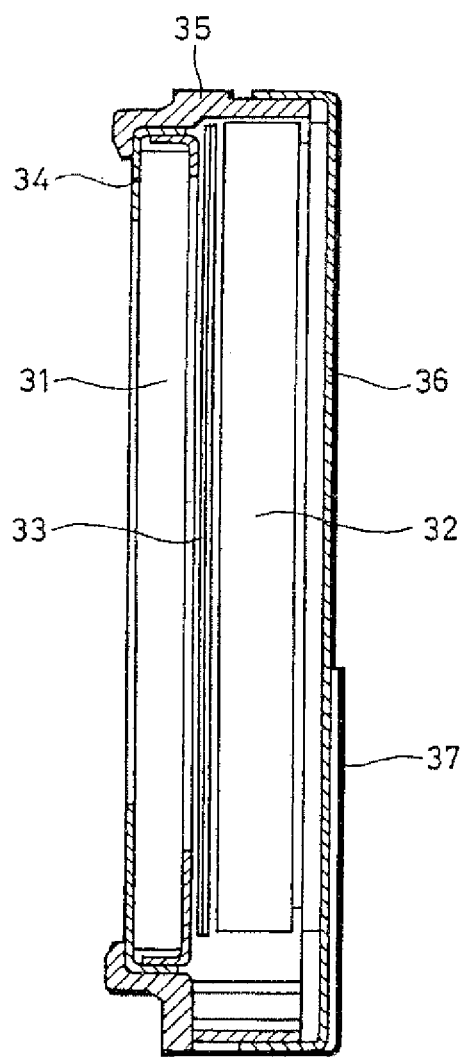
FIG. 8 is an expanded longitudinal sectional view of an image display unit of the video still camera shown in FIG. 1.
Figure 9:
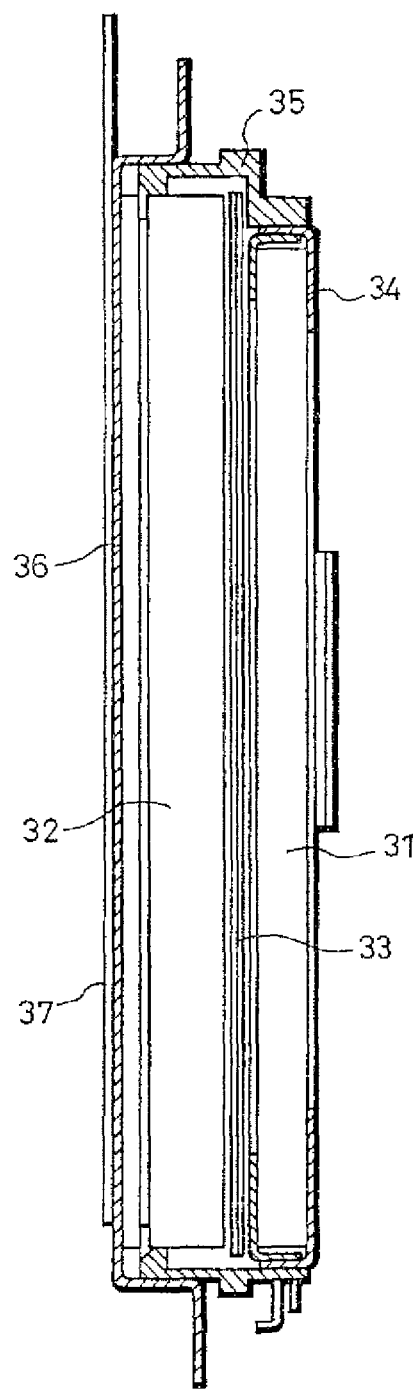
FIG. 9 is an expanded transverse sectional view of the image display unit of the video still camera shown in FIG. 1.

The video still camera of the present example will be described below in detail with reference to exploded perspective views of the camera body 1 and the photographing unit 2 shown in FIG. 6 and FIG. 7, and to longitudinal and transverse sectional views of the image display unit 3 shown in FIG. 8 and FIG. 9.

Figure 6:
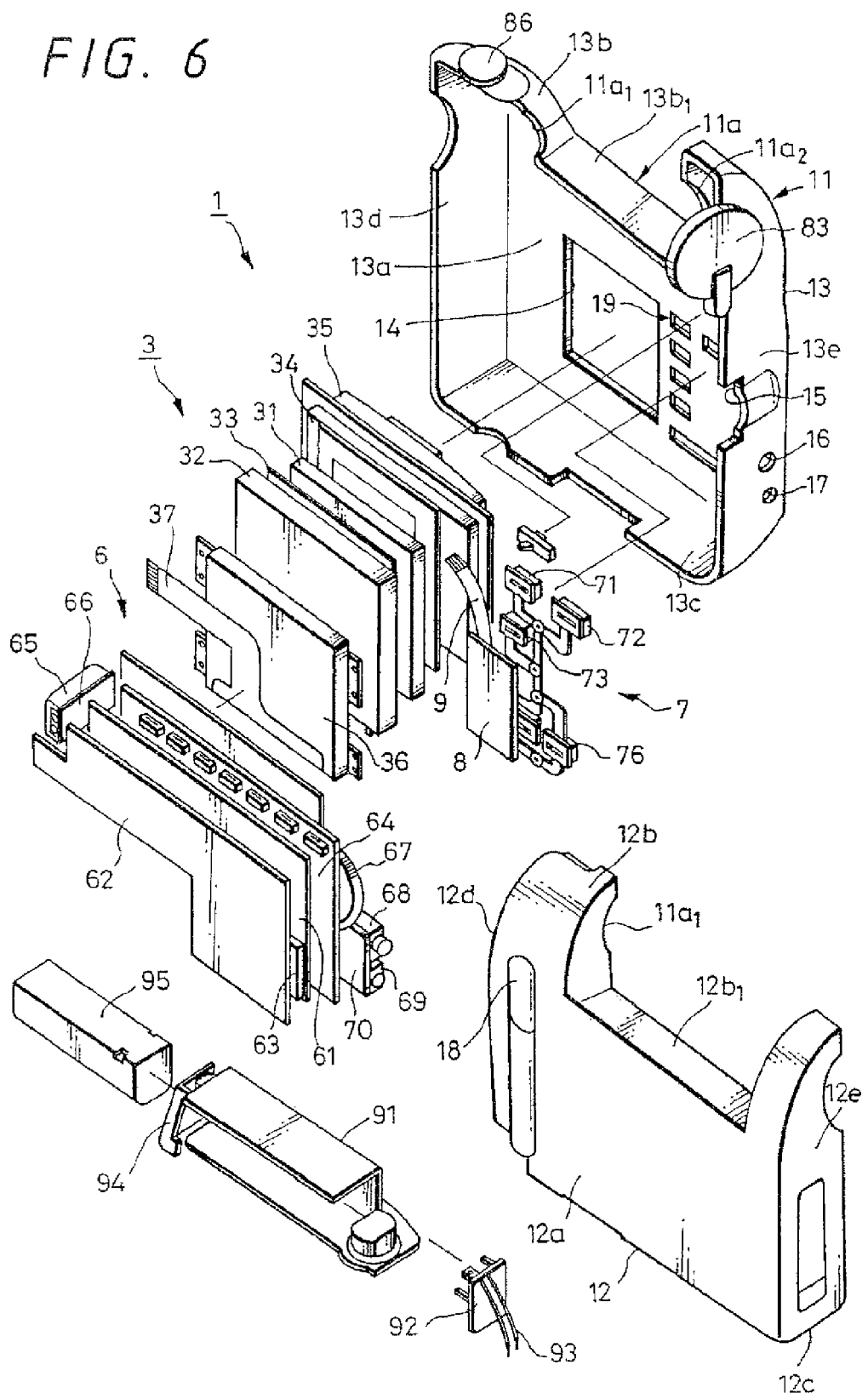
FIG. 6 is an exploded perspective view of a camera body of the video still camera shown in FIG. 1.

As shown in FIG. 6, the camera body 1 is constructed in a manner that its outermost housing 11 is formed by integrating a front panel 12 with a rear panel 13. The front panel 12 and the rear panel 13 are formed into a box shape having upper portions 12b and 13b individually corresponding to front and rear half portions of the upper peripheral portion of the outermost housing 11 relative to a front surface portion 12a and a rear surface portion 13a, bottom surface portions 12c and 13c, and right and left side surface portions 12d, 12e and 13d, 13e. The upper portions 12b and 13b of the front and rear panels 12 and 13 are formed with recess surface portions $12b_1$ and $13b_1$ on the right side surface portions 12e and 13e, respectively. In this manner, the upper portion of the outermost housing 11 is formed with a recess portion 11a. Also, the rear portion 13a of the rear panel 13 is formed with a window 14 for a screen of the image display unit 3 at the substantially center portion thereof. The screen of the display unit 3 will be described later.

The outermost housing 11 has a built-in recording/reproducing unit 6 including a flash memory used as a recording medium and the built-in image display unit 3.

The recording/reproducing unit 6 comprises a unit assembly substrate 61, a core substrate 62 equipped with a flash memory used as a recording medium and supported on the front side of the unit assembling substrate 61 via a multi-connector 63, and a video substrate 64 equipped with a video circuit and supported on the rear side of the substrate 61. Further, the recording/reproducing unit 6 is provided with an infrared ray data transmitter-receiver 65. The transmitter-receiver 65 is attached to the unit assembling substrate 61 via a terminal substrate 66. Also, the video substrate 64 is equipped with an operating dial 67 (hereinafter, referred to as a "menu jog dial") of a rotary encoder with a switch for operating a camera menu connected to the video circuit. A power terminal plate 70 is equipped with a video output terminal 68 and a DC power input terminal 69 which are attached via the terminal plate 70 to the video substrate 64.

When the recording/reproducing unit 6 thus constructed is attached to the inside of the front panel 12 a part of the menu jog dial 67 projects through an elongated aperture or a slit 15 formed through the right side surface portion 13e of the rear panel 13. Also, the video output terminal 68 and the power input terminal 69 are situated so as to face the insides of through-holes 16 and 17 formed below the slit 15. The infrared data transmitter-receiver 65 is located so as to correspond to a transparent window 18 formed on the left-hand side of the front portion 12a of the front panel 12 from its inside.

The image display part 3 comprises a liquid crystal display 31, a planar tube 32 used as a back light and a prism sheet 33 for increasing a quantity of light. As shown in FIG. 8 and FIG. 9, the liquid crystal display 31 is housed in a frame 34 and then is fitted into a holder 35, and the prism sheet 33 is arranged at its inside. When a fitting plate 36 attached with the planar tube 32 is fitted into the holder 35, the planar tube 32 is located at the inside of the prism sheet 33. A flexible distributing board 37 used as a lead wire for the planar tube 32 is led out to the outer side of the fitting plate 36, and is connected to the aforesaid power terminal plate 70.

In the image display part 3, the liquid crystal display 31 and the planar tube 32 are integrally assembled with the prism sheet 33 interposed therebetween. At that time, the liquid crystal display 31 and the planar tube 32 are in a sealed state, so that dust can be prevented from coming in the space therebetween. Thus, the liquid crystal display 31 is securely lightened by means of the planar tube 32, so that a pictorial image can be clearly displayed thereon.

The image display part 3 constructed as described above is attached to the inside of the rear surface panel 13 of the outermost housing 11, such that as shown in FIG. 2, a screen 3a which is the surface side of the liquid crystal display 31 is exposed through the window 14 of the rear portion 13a.

Within the rear surface panel 13, an operating button group 7 is attached to a button fitting plate 8 at the right-hand side of the image display part 3. The operating button group 7 is connected to a video substrate 64 by means of a flexible distributing board 9 so as to control the video circuit.

The operating button group 7 comprises a flash button 71 to be operated upon carrying out strobe photographing, a return button 72 to be operated, upon interrupting a menu operation, a self-timer button 73 to be operated upon carrying out a self-timer photographing, a rotation button 74 operated when rotating a display screen, that is, when rotating the screen for each angle of 90°, a screen display button 75 to be operated upon switching the display screen in the order of easy display, detail display, no display, and a review button 76 to be operated upon carrying out photographing while reproducing a photographed pictorial image. The respective buttons 71 to 76 have a pressing portions projecting from button window holes 19 which are situated on the side of the window 14 and formed through the rear surface portion 13a of the rear surface panel 13.

Figure 7:
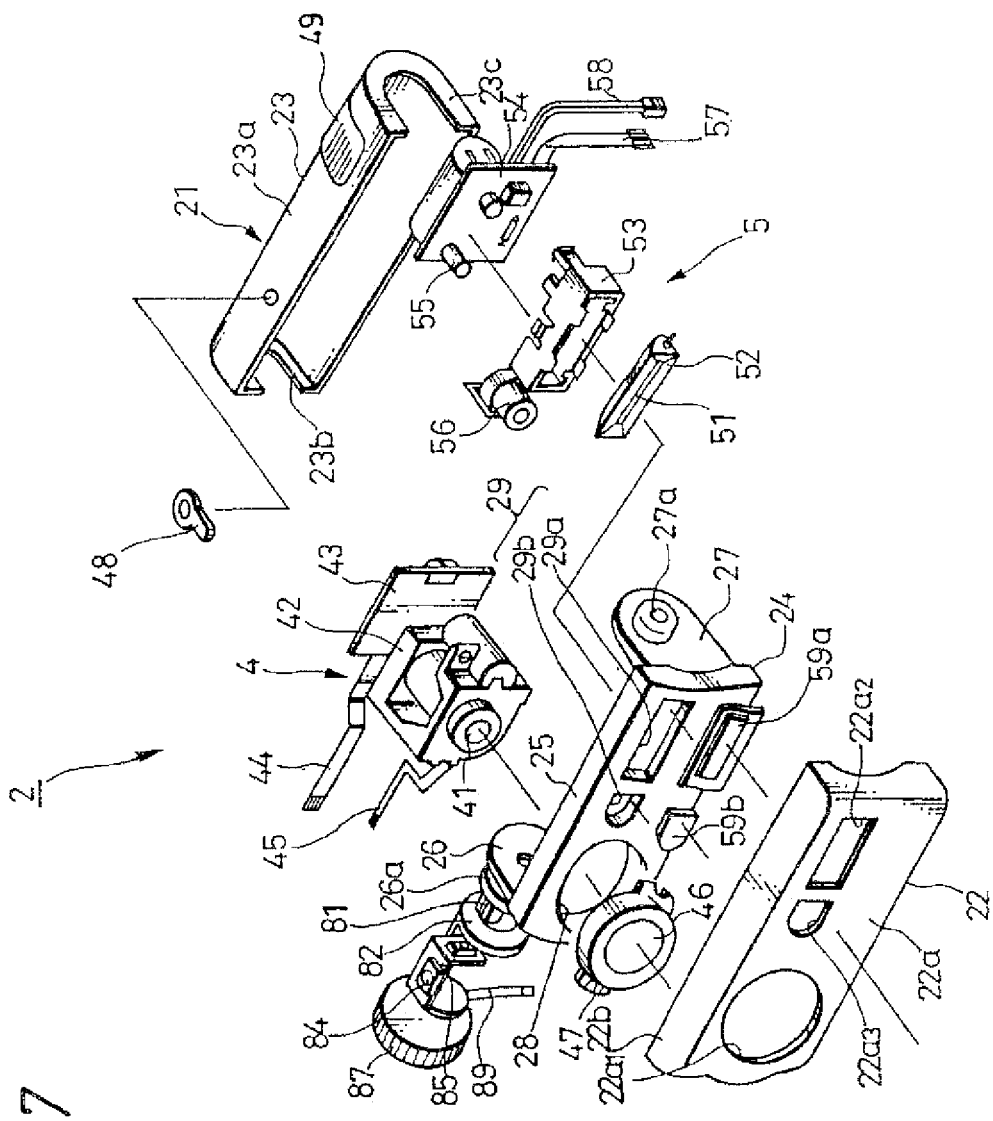
FIG. 7 is an exploded perspective view of a photographing unit of the video still camera shown in FIG. 1.

Next, as shown in FIG. 7, the photographing unit 2 has an outermost housing 21 which is formed by integrating a front side cabinet 22 with a rear side cabinet 23. The width of the outermost housing 21 is made to be substantially the same width as the aforesaid recess portion 11a of the outermost housing 11 of the camera body 1. The front side cabinet 22 has a peripheral surface portion 22b which is formed over the entire peripheral edge of a front surface portion 22a with a relatively low height. Also, the rear, side cabinet 23 has a main portion 23a which is formed into a U shape of substantially falling sideways over portions from the rear surface side to the up-and-down face sides thereof. The main portion 23a has side surface portions 23b and 23c which are subjected to a rise-up shaping at its opposite side edges.

A holder member 24 is fixedly fitted in to the outermost housing 21 formed by integrating the front side cabinet 22 and the rear side cabinet 23, and then, the lens unit 4 and the strobe unit 5 are attached to the holder 24, thus the photographing unit 2 being constructed.

The holder member 24 comprises a retaining plate portion 25 fitted into the front cabinet 22 of the outermost housing 21 and leg plate portions 26 and 27 which project backward from opposite sides of the retaining plate portion 25 and are respectively fitted into both side portions of the rear side cabinet 23. The retaining plate portion 25 has a lens window 28 correspondent to the lens unit 4, and a strobe window 29 correspondent to the strobe unit 5 which are formed with a predetermined interval in the transverse direction. The strobe window 29 is divided into a flash window 29a and a light receiving window 29b. Also, on the outside surfaces of the leg plate portions 26 and 27 there are respectively formed bearing bosses 26a and 27a which project outward with their axial lines being aligned with each other.

The holder member 24 is attached with the lens unit 4 and the strobe unit 5 which are arranged between the leg plate portions 26 and 27 of the retaining plate portion 25 with a predetermined interval in the transverse direction. The lens unit 4 is constructed in a manner that a solid state imaging device (hereinafter, referred simply to as a CCD) and a lens mechanism 41 capable of achieving pan-focus and macro photographing are coupled with each other and attached to a lens holder 42. A CCD circuit board 43 is fixed on the rear side of the lens holder 42, and a flexible distributing board 44 is led out therefrom which is connected to the aforesaid core substrate 62 side of the recording/reproducing unit 6. Also, a flexible distributing board 45 to be connected to the core substrate 62 is led out from the lens mechanism 41 side.

The lens unit 4 is attached to the inside surface of the retaining plate portion 25 of the holder 24 so as to correspond to the lens window 28. The front surface side of the lens window 28 is attached with a lens protective transparent plate 46 via a frame 47. The lens protective transparent plate 46 faces a lens window $22a_1$ of the front side cabinet 22 together with the frame 47. Also, the main portion 23a of the rear side cabinet 23 of the outermost housing 21 is provided with a macro photographing switching lever 48 for the lens unit 4 at its upper face on the left-hand side. Further, the main portion 23a is formed with a finger settlement portion 49 on the peripheral face on the right-hand side thereof.

The strobe unit 5 is constructed in a manner that a reflection plate 52 holding a strobe flash lamp 51 such as a xenon tube or the like is fixedly fitted to the inside of a strobe holder 53, the strobe holder 53 is attached to a strobe substrate 54 and then the strobe flash lamp 51 is connected to a power supply circuit. The strobe substrate 54 is mounted with a light receiving element 55 for adjusting a strobe flash mount by detecting an ambient height. The light receiving element 55 is inserted into and held by a holding cylinder 56 attached to the side portion of the strobe holder 53. A flexible distributing board 57 and a lead wire 58 are led out from the strobe substrate 54, and are respectively connected to the video substrate 64 of the record/reproducing unit 6 and the power terminal plate 70.

The strobe unit 5 is attached to the inner surface side of the retaining plate portion 25 of the holder 24 such a manner, that the strobe flash lamp 51 corresponds to the flash window 29a of the strobe window 29, and the light receiving element 55 corresponds to the light receiving window 29b. Protective transparent plates 59a and 59b are fitted in to the flash window 29a and the light receiving window 29b, respectively. The protective transparent plates 59a and 59b face strobe windows $22a_2$ and $22a_3$, respectively.

The photographing unit 2 is attached to the outermost housing 11 of the camera body 1 in such a manner that the bearing bosses 26a and 27a of both the leg plate portions 26 and 27 of the holder 24 are respectively inserted into insertion holes $11a_1$ and $11a_2$ formed so as to ride on the front and rear surface panels 12 and 13 on the inside of the recess portion 11a. Thus, the photographing unit 2 is rotatably supported by bearing members provided on the upper opposite sides of the outermost housing 11. The flexible distributing boards 44 and 45 on the lens unit 4 side are inserted from the left-hand side insertion hole $11a_1$ into the outermost housing 11 and then connected to the core substrate 62. On the other hand, the flexible distributing boards 57 and 58 on the strobe unit 5 side are inserted from the right-hand side insertion hole $11a_2$ into the outermost housing 11 and then connected to the video substrate 64 and power terminal plate 70 side, respectively.

As shown in FIG. 7, a support member 82 rotatably arranged around a shaft member 81, which is coupled to the bearing boss 26a, is fixed to the inside of the outermost hosing 11 by a screw or the like. Also, the bearing boss 27a is coupled to a lock mechanism including a lock lever 83 (see FIG. 6) rotatably supported on the right side surface of the outermost housing 11.

In the upper left side of the outermost housing 11 of the camera body 1, a shutter switch 84 attached to a fitting member 85 is located adjacent to the support member 82. A shutter button 86 for operating the shutter switch 84 is located on the upper left-side surface of the outermost housing 11. The left-hand side surface of the outermost housing 11 of the camera body 1 is attached with a power/function dial 87 which is connected to the video substrate 64 of the recording/reproducing unit 6 by means of a flexible distributing board 89. If the power/function dial 87 rotated, it is possible to select a power on-off operation, a reproducing operation, and auto/manual photographing switching operation.

The camera body 1 is provided with a battery case 91 at the lower portion of the outermost housing 11 thereof, as shown in FIG. 1 and FIG. 6. To one end portion of the battery case 91 there is attached a battery terminal plate 92 to which a lead wire 93 is connected. To the outer end portion of the battery case 91 there is attached a battery lid 94 which will cover an opening at the lower portion on the left side surface of the outermost housing 11. A battery housed in the battery case 91 as a power source is a charging battery for example, a charging type lithium ion battery 95 applicable.

As shown in FIG. 5, on the bottom surface side of the battery case 91 there are provided a tripod screw hole 96, a screen brightness adjusting dial 97, a reset button 98 and a hook portion 99 for a dry battery adapter which will be described later.

Figure 10:
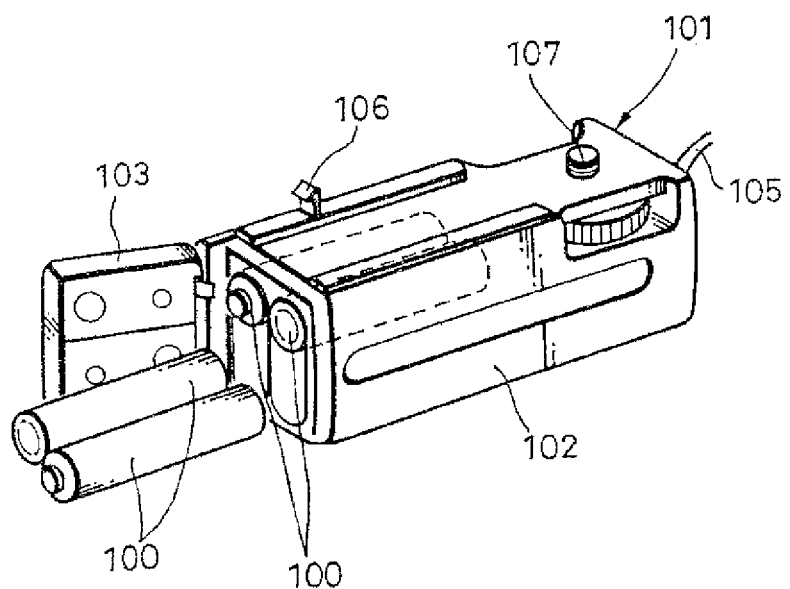
FIG. 10 is a perspective view showing a state of opening a lid of an example of the dry battery adapter which is applied to the video still camera of the present invention.

A dry battery is applicable as a power source for the video still camera constructed as described above. In order to apply the dry battery, a dry battery adapter 101 as shown in FIG. 10 is used.

The dry battery adapter 101 comprises a box-like body 102 housing there in four size-AA dry batteries 100, and a lid 103 used as a battery connecting terminal plate. A lead wire 105 with a plug 104 to be connected to the camera body 1 side is led out from the body 102. On the upper surface of the box-like body 102, a hooked pawl 106 which is engaged with the hook portion 99 of the camera body 1 side is projected and also, a fastening screw 107, which is screwed into the tripod screw hole 96, is rotatably attached.

The dry battery adapter 101 is fixed onto the lower surface side of the camera body 1, that is, the lower surface of the battery case 91, in a manner of engaging the hooked pawl 106 with the hook portion 99 and screwing the fastening screw 107 into the tripod screw hole 96. When the plug 104 of the lead wire 105 is inserted into the DC power input terminal 69 of the camera body 1 side through the through hole 17, the size AA dry battery 100 becomes a power source of the camera body 1.

In the video still camera constructed as described above, when the power supply is turned on by rotating the function dial 87 to set the auto photographing, the image of an object captured by the lens unit 4 of the photographing unit 2 is displayed on the screen 3a of the image display unit 3. Then, in this state, when the shutter 84 is pushed through the shutter button 86, the object is photographed. The photographed still image is displayed on the screen 3a of the image display unit 3 and also recorded in the recording/reproducing unit 6.

When the function dial 87 is set to the manual photographing, the brightness, the shutter speed, the picture quality and the like are adjusted by a user on the menu screen before photographing. Also, in the case where macro photographing is carried out, the macro photographing switching lever 48 is operated to switch the lens unit 4 to the macro photographing side. Moreover, in the case where strobe photographing is carried out, the flash button 71 is pushed, and thereafter, when the shutter 84 is pushed as described above, the strobe photographing is carried out.

With use of various menus, photographings corresponding to these menus can be carried out and recorded.

When the function dial 87 is set to a reproduction after photographing and recording, the photographed still image is reproduced, and then, is displayed on the screen 3a of the image display unit 3.

The photographed and recorded still image is transmitted to a video still camera, a personal computer, etc. including an infrared data transmitter/receiver through the infrared data transmitter/receiver 65, and then, is subjected to dubbing. Also, the aforesaid still image is transmitted to a digital printer, and then, can be printed.

As described above, according to the video still camera of the present example in which the photographed still image is displayed on the screen 3*a* of the image display unit 3, and is recorded and reproduced in the recording/reproducing unit 6, the photographing unit 2 is rotatable in the up-and-down direction relative to the camera body 1. Therefore, when the lock lever 83 is operated to release the lock of the photographing unit 2 relative to the camera body 1, the photographing unit 2 is rotated and changed to a desired angle, and is located again, thus photographing being carried out at the position where its photographing angle is changed. Moreover, if the photographing unit 2 is rotatable by 180° with respect to the camera body 1, photographing can be carried out in a state that the user faces the screen 3*a* of the image display unit 3. Namely, the user can look at the image while photographing the user himself.

The aforesaid photographing at a changed angle position can be carried out without changing an angle of the camera body 1, so that there is no need of changing the angle of user's hand holding the camera body 1 and also no need of changing the angle for looking the screen 3*a* of the image display unit 3.

Even in photographing at the changed angle position, the strobe unit 5 is rotated integrally with the lens unit 4, and the photographing angle is freely changed, so that the strobe photographing can be carried out in the same manner as photographing at a usual position.

The photographing unit 2 rotatable with respect to the camera body 1 is rotatably supported on the both sides of the camera body 1. Thus, the photographing unit 2 is always stably rotated, and is securely locked at a desired angle position. Accordingly, photographing at various angle positions, that is, at a low angle position or a high angle position can be carried out without blur, and also, photographing can be securely carried out in the same manner as a camera having a construction in which the photographing unit is integrated with camera body.

The flexible distributing boards 44 and 45 on the lens unit 4, and the flexible distributing board 57 and lead wire 58 on the strobe unit 5, which electrically connect the lens unit 4 and the strobe unit 5 of the photographing unit 2 rotatable together relative to the camera body 1 to the recording/reproducing unit 6 of the camera body 1 camera body 1 are introduced through different side portions of the outermost housing 11 of the camera body 1, that is, through the left side portion and the right side portion thereof. Therefore, the distributing boards of both the lens unit and the strobe unit have no risk of carelessly contacting with each other. Therefore, mechanical noise caused in flashing of the strobe unit 5 is not badly influenced on an image signal of the lens unit 4, and hence a more clear still image can be recorded and reproduced.

The liquid crystal display 31 of the image display unit 3 and the planar tube 32 used as the back light are integrated with each other by a sealing structure, so that dust or the like can be prevented from coming therein. Thus, a more clear still image can be always displayed on the screen 3*a* of the image display unit 3.

One embodiment of the present invention has been described. The present invention is not limited to the above embodiment, and various modifications can be made within a scope of the present invention.

For example, the camera body 1 and the photographing unit 2 are not restricted to a shape shown in the figures. There may be a structure in which the photographing unit 2 having the lens unit 4 and the strobe unit 5 arranged in the transverse direction with a predetermined interval is supported on opposite sides of the camera body 1.

The recording/reproducing unit 6 is not restricted to the construction shown in the figures. A memory card may be used as the recording medium. Also, the image display unit 3 may be constructed such that it can be detachable relative to the camera body 1.

The present invention is applicable to various digital still cameras.

As described above, according to the video still camera of the present invention, the lens unit and the strobe unit are arranged in the identical box body, and are attached to the camera body such that they are rotatable in the up-and-down direction. Therefore, there is no need of changing an angle of user's hand holding the camera body and also no need of changing the hand position, and strobe flash photographing can be carried out at a free angle in the up-and-down direction or front-and-rear direction. Moreover, a low-angle and a high-angle photographings can be securely carried out under a dark light or a back light.

Having described a preferred embodiment of the present invention with reference to the accompanying drawings, it is to be understood that the present invention is not limited to the above-mentioned embodiment and that various changes and modifications can be effected there in by one skilled in the art without departing from the spirit or scope of the present invention as defined in the appended claims.

The invention claimed is:

1. An image processing and transmitting apparatus comprising:
    a display unit for displaying an image; and
    a data transmission component being configured to transmit and receive an image to and from another apparatus;
    wherein said apparatus is configured to selectively control said display unit to set an easy display, detail display and no display.

2. The apparatus of claim 1 further comprising a screen display button configured to permit a user to selectively set the easy display, detail display and no display.

3. The apparatus of claim 1 wherein the data transmission component is arranged on a side of the apparatus that is different from a side of the apparatus where the display unit is arranged.

4. The apparatus of claim 3 wherein the data transmission component comprises an infrared ray transmitter and receiver.

5. The apparatus of claim 4 wherein the data transmission component transmits through a transparent window.

6. The apparatus of claim 1 wherein the apparatus is configured to display an image on the image display unit and permit a user to select the displayed image for transmission to another apparatus when it is displayed.

7. The apparatus of claim 1 further comprising an image pickup unit, the image pickup unit being arranged on a side of the apparatus which is different from a side of the apparatus where the display unit is arranged.

8. A camera apparatus for image processing and transmitting comprising:
    a display unit for displaying an image;
    an image pickup unit, the image pickup unit being arranged on a side of the apparatus which is different from a side of the apparatus where the display unit is arranged; and a data transmission component being configured to transmit and receive an image to and from another apparatus;

wherein said apparatus is configured to selectively control said display unit to set an easy display, detail display and no display in response to a user activation of a screen display button of the apparatus.

9. The apparatus of claim 8 wherein the data transmission component is arranged on a side of the apparatus that is different from a side of the apparatus where the display unit is arranged.

10. The apparatus of claim 9 wherein the apparatus is configured to display an image on the image display unit and permit a user to select the displayed image for transmission to another apparatus when it is displayed.

11. The apparatus of claim 10 further comprising a transparent window through which the transmission component is arranged to transmit and receive image data.

\* \* \* \* \*